United States Patent
Richerzhagen et al.

(10) Patent No.: US 12,186,833 B2
(45) Date of Patent: Jan. 7, 2025

(54) APPARATUS FOR 3D SHAPING OF A WORKPIECE BY A LIQUID JET GUIDED LASER BEAM

(71) Applicant: SYNOVA S.A., Duillier (CH)

(72) Inventors: Bernold Richerzhagen, Saint-Sulpice (CH); David Hippert, Lancy (CH); Helgi Diehl, Morges (CH)

(73) Assignee: SYNOVA S.A., Duiler (CH)

( * ) Notice: Subject to any disclaimer, the term of this patent is extended or adjusted under 35 U.S.C. 154(b) by 123 days.

(21) Appl. No.: 16/768,731

(22) PCT Filed: Dec. 4, 2018

(86) PCT No.: PCT/EP2018/083467
§ 371 (c)(1),
(2) Date: Jun. 1, 2020

(87) PCT Pub. No.: WO2019/110580
PCT Pub. Date: Jun. 13, 2019

(65) Prior Publication Data
US 2021/0170529 A1    Jun. 10, 2021

(30) Foreign Application Priority Data
Dec. 4, 2017  (EP) ..................... 17205193

(51) Int. Cl.
*B23K 26/36*    (2014.01)
*B23K 26/0622*   (2014.01)
(Continued)

(52) U.S. Cl.
CPC .......... *B23K 26/36* (2013.01); *B23K 26/0622* (2015.10); *B23K 26/082* (2015.10); *B23K 26/0861* (2013.01); *B23K 26/146* (2015.10)

(58) Field of Classification Search
CPC .. B23K 26/36; B23K 26/0622; B23K 26/082; B23K 26/146; B23K 26/032;
(Continued)

(56) References Cited

U.S. PATENT DOCUMENTS 5,541,416 A * 7/1996 Washizuka ......... G01N 21/9501
                                                        250/459.1
5,698,120 A * 12/1997 Kurosawa ............ B23K 26/382
                                                        219/121.62
(Continued)

FOREIGN PATENT DOCUMENTS

DE    102012003202 A1   8/2013
EP      3124165 A1      2/2017
(Continued)

OTHER PUBLICATIONS

International Search Report and Written Opinion issued in connection with the corresponding International Application No. PCT/EP2018/083467 on Mar. 8, 2019.
(Continued)

*Primary Examiner* — Steven W Crabb
*Assistant Examiner* — Alba T Rosario-Aponte
(74) *Attorney, Agent, or Firm* — The H.T. Than Law Group

(57) ABSTRACT

The invention relates to an apparatus 100 for 3D shaping of a workpiece 101 by material ablation with a laser beam 102. The apparatus 100 comprises a machining unit 103, which is configured to provide a pressurized fluid jet 104 onto the workpiece 101 and to couple the laser beam 102 into the fluid jet 104 towards the workpiece 101. Further, the apparatus 100 includes a motion controller 105 configured to set an x-y-z-position of the workpiece 101 relative to the machining unit 103. It also includes a measuring unit 107 configured to measure a z-position of the point of incidence
(Continued)

108 of the pressurized fluid jet 104 on the workpiece 101 in the z-direction.

24 Claims, 10 Drawing Sheets

(51) Int. Cl.
*B23K 26/08* (2014.01)
*B23K 26/082* (2014.01)
*B23K 26/146* (2014.01)

(58) Field of Classification Search
CPC ............ B23K 26/0626; B23K 26/0861; B23K 26/362; G05B 2219/45041; G05B 2219/45165
USPC ............ 219/121.61, 121.62, 121.63, 121.64, 219/121.68, 121.69, 121.72, 121.83
See application file for complete search history.

(56) References Cited

U.S. PATENT DOCUMENTS

| | | | |
|---|---|---|---|
| 7,273,997 | B2 | 9/2007 | Lambert et al. |
| 8,263,900 | B2 | 9/2012 | Maehara et al. |
| 10,335,900 | B2 | 7/2019 | Hu |
| 11,318,560 | B2 | 5/2022 | Richerzhagen et al. |
| 2006/0062265 | A1* | 3/2006 | Denney ................ B23K 26/032 372/38.02 |
| 2015/0121960 | A1* | 5/2015 | Hosseini ................ B23K 26/53 65/29.11 |
| 2015/0255248 | A1* | 9/2015 | Boguslavsky .......... H01J 37/20 204/298.36 |
| 2016/0199941 | A1 | 7/2016 | McDowell et al. |
| 2016/0228988 | A1* | 8/2016 | Dallarosa ............... B23K 26/32 |
| 2016/0368083 | A1 | 12/2016 | Lowell et al. |
| 2017/0157709 | A1 | 6/2017 | Richerzhagen et al. |
| 2018/0214982 | A1 | 8/2018 | Richerzhagen et al. |
| 2021/0162540 | A1* | 6/2021 | Houbertz ............ G03F 7/70416 |

FOREIGN PATENT DOCUMENTS

| | | |
|---|---|---|
| JP | H11245059 A | 9/1999 |
| JP | H11254161 A | 9/1999 |
| JP | 2005125398 A | 5/2005 |
| JP | 2009000698 A | 1/2009 |
| JP | 2009190082 A | 8/2009 |
| JP | 2009241138 A | 10/2009 |
| JP | 2010115680 A | 5/2010 |
| JP | 2011064503 A | 3/2011 |
| JP | 2011212710 A | 10/2011 |

OTHER PUBLICATIONS

Machine translation of DE 102012003202 to Saegmueller et al.
European Search Report issued in connection with the corresponding European Patent Application No. 17205193.0 on Jun. 26, 2018.
Translation of First Office Action issued in connection with the corresponding Chinese Patent Application No. 20188078642.X on Sep. 9, 2021.
European Office Action issued in connection with the corresponding European Patent Application No. 17205193.0 on Nov. 4, 2021.
Machine translation of JP 2011212710 to Keiichi et al.
Machine translation of JP 2011064503 to Koji.
Machine translation of Jp 2010115680A to Hidenobu et al.
Machine translation of JP2005125398 A to Hirotaka.
Machine translation of JPH11254161 A to Makoto.
Machine translation of JP 2009000698 A to Oasako Sadanobu.
Machine translation of JP 2009241138 A to Muratsubaki Ryoji et al.
Machine translation of JP 2009190082 A to Sasaki Motoi et al.
Machine translation of DE 102012003202 A1 to Saegmueller et al.
Translated excerpts of the office actions issued in connection with the related Japanese patent applications.
Machine translation of Jp H11245059 A to Sumitomo Heavy Industries.
Korean Office Action issued in connection with the corresponding Korean Patent Application No. 10-2020-7015417 on Feb. 14, 2023.

* cited by examiner

APPARATUS FOR 3D SHAPING OF A WORKPIECE BY A LIQUID JET GUIDED LASER BEAM

TECHNICAL FIELD

The present invention relates to an apparatus for three-dimensional (3D) shaping of a workpiece into a final part by material ablation. The material ablation is effected with a laser beam, preferably a pulsed laser beam, which is guided in a fluid jet onto the workpiece. The present invention relates further to a method for 3D shaping of a workpiece by material ablation with a laser beam coupled into a fluid jet.

BACKGROUND

A conventional apparatus for machining a workpiece with a laser beam that is coupled into a pressurized fluid jet is generally known. However, the "machining" of the workpiece with such a conventional apparatus is limited to through-cutting and -drilling. The machining process control of the apparatus is not sufficient to allow full 3D shaping of the workpiece into a final part. This is mainly due to the fact that the conventional apparatus at best knows, at which x-y-position of the workpiece the laser beam ablates material, but does not know the z-position at which material ablation occurs. As a consequence, the apparatus is also unable to determine how much material the laser beam actually ablates in z-direction (depth) of the workpiece. Therefore, the conventional apparatus cannot, for instance, precisely control a cutting depth or a drilling depth into the workpiece.

Conventional 3D shaping of a workpiece is either done by Additive Manufacturing (AM) or Subtractive Manufacturing (SM). While "AM" refers to a process which builds up a desired 3D shape of a final part by material deposition, typically layer-by-layer deposition, "SM" refers to a process which removes material from a workpiece (solid body), in order to obtain a desired 3D shape of a final part. For many practical applications SM is preferred over AM. This is, because many parts can be produced faster, more efficiently, and more economically with SM.

Further, laser SM, i.e. removing material from a workpiece with a laser beam, has the advantage that it can be combined with conventional machining techniques, e.g. milling, in order to achieve a more efficient overall shaping process. However, conventional laser SM is a relatively slow and rather imprecise process.

In view of the above, the present invention aims at improving conventional SM for producing parts with desired 3D shapes, particularly improving the process speed and precision. To this end, the invention intends to employ the advantages of an apparatus for machining a workpiece with a laser beam coupled into a fluid jet with SM. Accordingly, it is an object of the present invention to provide an apparatus and method for 3D shaping of a workpiece by material ablation with a laser beam that is guided by a fluid jet. In particular, the apparatus and method should be able to shape the workpiece into a final part having any desired 3D shape. The shaping process should be fast and accurate. Thereby, the apparatus and method of the invention should also make the SM process more efficient and economic than conventional SM.

SUMMARY OF THE INVENTION

The object of the present invention is achieved by the solution provided in the enclosed independent claims. Advantageous implementations of the present invention are defined in the dependent claims.

In particular, the present invention proposes the use of a laser beam coupled into a fluid jet for 3D shaping of a workpiece by material ablation. The workpiece is shaped with the laser beam into a final part by removing material from the workpiece. In other words, the final part is obtained by SM.

A first aspect of the invention provides an apparatus for 3D shaping of a workpiece by material ablation with a laser beam, the apparatus comprising a machining unit configured to provide a pressurized fluid jet onto the workpiece and to couple the laser beam into the fluid jet towards the workpiece, a motion controller configured to set an x-y-z-position of the workpiece relative to the machining unit, a measuring unit configured to measure a z-position of the point of incidence of the pressurized fluid jet on the workpiece in the z-direction.

The motion controller allows moving the workpiece in three dimensions to effect the shaping of any 3D contours with the laser beam. The set x-y-z-position relates to a position of the workpiece in a predefined axis (coordinate) system with, respect to an original position (0-0-0-position). The x-y-z-position of the workpiece set by the motion controller may thereby be determined by the positioning of a movable machining surface, on which the workpiece is provided. The motion controller may further be able to move the workpiece along rotational directions (e.g. effect panning, tilting and rolling). The motion controller is preferably able to change the position of the workpiece with high speed and high accuracy. Thus, 3D shaping of the workpiece by material ablation is enabled in a speed and precision that does not exist today. Alternatively, the axis system moves the machining unit in all linear and rotary axes or in some of these axes.

During the 3D shaping process, the measuring unit functions as a depth sensor, and provides knowledge about the z-positon of the material ablation at any time and at any position, i.e. where fluid jet and laser beam impact on the workpiece. This z-position is usually different from the z-position of the material surface set by the motion controller. This z-position may change, for instance, if the fluid jet is moved along the workpiece surface or if the laser beam ablates material from the workpiece surface, i.e. machines into the workpiece. The latter moves the point of incidence deeper into the workpiece. One reason for setting also a z-position by the motion controller is to ensure a controlled shaping process. Preferably, the workpiece is positioned such that it is impinged by the fluid jet in a distance from the fluid jet creation point that is constantly within a determined range. Accordingly, the workpiece can always interact with the part of the fluid jet, which most efficiently guides the laser beam, even if more and more workpiece material is ablated from the workpiece in the z-direction. Notably, in this document the term "fluid jet" means the laminar fluid jet, able to guide a laser beam like a fiber. The fluid output by the apparatus forms a laminar fluid jet only over a certain length, and beyond that length the fluid jet becomes an unstable fluid flow that finally disperses into droplets.

In this document, "measuring" the z-position of the point of incidence of the fluid jet on the workpiece includes at least one active measurement of a physical quantity. For instance, it may include a measurement of a time difference between a time point of emitting waves from the measuring unit and a time point of receiving waves reflected from the workpiece by the measuring unit. As another example, it may include a measurement of a phase difference of different waves, if an interferometric principle is used. As another example, it may include an optical, electrical or capacitive measurement of a characteristic length of the fluid jet. "Measuring" the z-position does not merely mean estimating the z-position based on, for instance, some known dimensions of the apparatus, the workpiece and/or the final part. The measured z-position of the point of incidence of the fluid jet on the workpiece allows determining how much material the laser beam ablates in z-direction from the workpiece at a given x-y-position. This information is crucial for obtaining a full 3D shaping capability. The x-y-positions at which material ablation occur are derivable from the x-y-coordinates of the x-y-z-position set by the motion controller. Accordingly, the apparatus of the first aspect has full control and position information about the 3D shaping process of the workpiece.

Accordingly, the apparatus is advantageously configured to control the 3D shaping of the workpiece by material ablation based on the z-position of the point of incidence of the pressurized fluid jet on the workpiece.

In a preferred implementation form of the first aspect, the laser controller is configured to adjust the power or energy of the laser beam based on an x-y-z-position set by the motion controller and a z-position of the point of incidence of the pressurized fluid jet on the workpiece measured by the measuring unit.

Thus, a fast, precise, and fully controlled 3D shaping process of the workpiece is possible.

In a further preferred implementation form of the first aspect, the laser beam is pulsed, and the apparatus further comprises a laser controller configured to adjust individually the energy of each laser pulse based on an x-y-z-position set by the motion controller for that laser pulse and a z-position of the point of incidence of the pressurized fluid jet on the workpiece measured by the measuring unit before that laser pulse.

That means, the energy of each laser pulse can be individually adjusted by the apparatus to effect a certain amount of material ablation in the z-direction (depth) of the workpiece (at a given x-y-position of laser ablation). In particular, the ablation result of each laser pulse can be controlled in a fast and direct way. Consequently, a fast and precise 3D shaping process of the workpiece is possible.

In a further preferred implementation form of the first aspect, the measuring unit is configured to determine an ablation result of each laser pulse at the z-position of the point of incidence of the pressurized fluid jet on the workpiece measured by the measuring unit after that laser pulse, and the laser controller is configured to adjust the energy of the next laser pulse based on the determined ablation result.

Thus, the apparatus gains knowledge about the amount of material that was ablated in z-direction with the last laser pulse, and can take this information into account when setting the energy for the next laser pulse. Two laser pulses may occur at different x-y-positions of the workpiece, in order to ablate a layer from the workpiece surface. Two laser pulses may, however, also occur at the same x-y-positon of the workpiece, in order to obtain a certain amount of material ablation or to correct an ablation result. Consequently, the apparatus is configured to control the ablation at each point on the workpiece, so that the 3D shaping of the workpiece can be carried out very accurately.

In a further preferred implementation form of the first aspect, the laser controller is configured to control the energy of each laser pulse by setting its width and/or amplitude and/or by setting a pulse rate and consequently a time delay between consecutive pulses and/or by executing a pulse burst.

Thus, the apparatus is provided with several means of controlling the laser beam ablation, which further improves the precision and efficiency of the 3D shaping process.

In a further preferred implementation form of the first aspect, the laser controller is configured to control the energy of each laser pulse such that it ablates in z-direction between 1-1000 µm depth of workpiece material at the x-y-z-position of the workpiece set by the motion controller for that laser pulse.

Thus, the apparatus is configured to set the ablation depth in z-direction individually at each x-y-position. Accordingly, the apparatus is configured to ablate one or more layers of workpiece material from the surface of the workpiece. Thereby, the ablated layers may have a uniform or non-uniform thickness between 1-1000 µm, preferentially 1-200 µm.

In a further preferred implementation form of the first aspect, the apparatus further comprises a laser source for generating the laser beam, the laser source including the laser controller and a fast switch, preferably a Q-switch, for modulating the laser pulses.

The laser source is included in the apparatus. The switch allows the apparatus to affect a fast modulation of the laser pulses, and thus to accurately and individually control their energy from 0 to 100%. Accordingly, a fast and precise 3D shaping process is supported.

In a further preferred implementation form of the first aspect, the measuring unit is configured to measure the z-position of the point of incidence of the fluid jet on the workpiece within a time period between two subsequent laser pulses.

In this way, the measurement of the z-position carried out by the apparatus does not interfere with the material ablation induced by the laser beam pulses. The precision of the measurement of the z-position can consequently be increased. Controlling the 3D shaping process becomes easier as well.

In a further preferred implementation form of the first aspect, the motion controller is configured to step-wise or continuously change the x-y-z-position of the workpiece relative to the machining unit after each laser pulse.

Thus, the apparatus is able to pulse-wise ablate material at a determined x-y-position of the workpiece. As a consequence, a fully digital material ablation process is enabled. Layers or structures of material can be ablated from the workpiece surface. Ablated layers may cover the complete surface or only part of the surface. Thus, different regions of the workpiece surface may be ablated differently in the z-direction, thereby providing the ability to shape the workpiece in 3D.

In a further preferred implementation form of the first aspect, the motion controller is configured to accelerate or decelerate the changing of the x-y-z-position of the workpiece when moving the workpiece along a trajectory, and the laser controller is configured to increase or decrease a laser pulse frequency, respectively, such that a number of laser pulses per distance is constant along the trajectory.

The precision of the ablation process can thus be further improved. Notably, it is also possible for the laser controller to apply a higher or lower number of laser pulses during a certain phase of movement or in certain regions of the workpiece. For instance, if higher or lower precision (or more or less material removal is required), achievable with more or less laser pulses, is only needed locally.

In a further preferred implementation form of the first aspect, the motion controller is configured to repeatedly change the x-y-z-position of the workpiece such that the laser beam scans the workpiece surface in the x-y-plane.

For instance, the x-y-z-position may be change after each laser pulse. Thus, layers covering the complete workpiece surface (or only a part of the workpiece surface) can be ablated. This allows for a precise and flexible 3D shaping of the workpiece into the final part.

In a further preferred implementation form of the first aspect, the apparatus is configured to selectively activate or deactivate the laser beam during the scan of the workpiece surface depending on the x-y-z-positions given by the motion controller.

The laser beam may be selectively activated or deactivated by a fast switch of the laser source, for instance a Q-switch, during a continuous motion ("on the fly"). The motion controller may provide a signal at various x-y-z-positions to the laser controller during the motion, which may accordingly control the switch. As a consequence, the laser beam may be turned ON and thus ablates material at some x-y-z-positions set by the motion controller, and may be turned OFF and thus does not ablate material at some other x-y-z-positions set by the motion controller. In this way material ablation occurs only at some positions or in some areas on the workpiece surface depending on the position of the workpiece relative to the machining unit and the speed is constant, which also means that the ablation depth is constant. The apparatus has thus the advantage of faster processing.

In a further preferred implementation form of the first aspect, the apparatus is further configured to shape the workpiece by ablating, layer-by-layer, a plurality of layers of workpiece material with the laser beam.

As mentioned above, layers can be 1-1000 μm thick and can also have non-uniform thickness. Further, each layer may cover a different part of the workpiece surface. Accordingly, layer-by-layer a precise shaping of the workpiece into the desired 3D shape is possible.

In a further preferred implementation form of the first aspect, each of the plurality of layers takes an individually predetermined area in the x-y-plane and has an individually predetermined uniform or non-uniform thickness along the z-direction.

The area and thickness for each layer can be determined individually. Multiple layers ablated individually in this way lead to an overall ablated volume of workpiece material, yielding the final 3D part made from the remaining workpiece material.

In a further preferred implementation form of the first aspect, the apparatus further comprises a processing unit configured to calculate a layered representation of the to be ablated volume of the workpiece, wherein the apparatus is configured to shape the workpiece by ablating the plurality of layers of workpiece material based on the calculated layered representation.

The layered representation is calculated before or during the 3D shaping process and functions as a digital input that determines the overall volume and shape of the ablated workpiece material.

Accordingly, full and precise control is gained over the ablation process. The layered representation also allows making adjustments during the material ablation process.

In a further preferred implementation form of the first aspect, the laser controller is configured to control the energy of the laser beam based further on the layered representation received from the processing unit.

In particular, the laser controller may control the energy of each laser pulse based on the layered representation. The layered representation functions as a digital input or programming of the apparatus, and thus allows carrying out a precise and full 3D material ablation process.

In a further preferred implementation form of the first aspect, the measuring unit is configured to feedback a measured z-position of the point of incidence of the fluid jet on the workpiece to the processing unit, and the processing unit is configured to recalculate the layered representation, particularly a number of layers of the layered representation, based on the feedback from the measuring unit.

In this way, the ablation process can be adjusted to increase its precision. For instance, if the material ablation intended at a certain position or with a certain laser pulse is not the same as the material ablation result, this deviation can be taken into account so as to compensate and guarantee the preciseness of the 3D shaping process.

In a further preferred implementation form of the first aspect, the processing unit is configured to recalculate the layered representation after each workpiece material layer that is ablated from the workpiece.

In this way, errors and deviations from the intended ablation result, like irregularities that occur during the shaping process, can be corrected in due time. As a consequence, the accuracy of the 3D shaping of the workpiece into the final part is improved.

In a further preferred implementation form of the first aspect, the measuring unit is further configured to determine a first inclination and/or surface irregularity of a lastly ablated workpiece material layer by scanning the workpiece surface in the x-y-plane and thereby measuring z-positions of a plurality of points of incidence of the fluid jet on the workpiece and a second inclination and/or surface irregularity on the surface of the workpiece, and the apparatus is configured to ablate at least a next layer or next layers based on the first inclination and/or surface irregularity determined by the measuring unit.

Any undesired inclination or irregularity occurring during the ablation process can thus be corrected with or starting from the next layer. One or several layers may be required to completely compensate for the inclination and/or irregularity. Consequently, it can be avoided that the deviation from the intended ablation result worsens over the process duration and—in the worst case becomes uncorrectable at some point.

In a further preferred implementation form of the first aspect, the laser controller is configured to adapt, for at least the next layer, individually the energy of each laser pulse and/or a trajectory of moving the workpiece by changing the x-y-z-position after each laser pulse based on the first inclination and/or surface irregularity determined by the measuring unit.

Due to the relative movement between the workpiece and the fluid jet, a change of the trajectory of movement of the workpiece means also a change of the trajectory of the fluid jet as it moves over the workpiece surface. Changing the trajectory of the workpiece movement may particularly include changing the direction of movement, the moving speed, the acceleration, and/or the radius of a curved movement.

In a further preferred implementation form of the first aspect, the measuring unit is configured to measure the z-position of the point of incidence of the fluid jet on the workpiece by using an electromagnetic radiation or acoustic waves.

The electromagnetic radiation or the acoustic waves are preferably selected such that they do not cause any ablation of material from the workpiece. In this way, a precise determination of the z-position of the point of incidence of the fluid jet on the workpiece is enabled without interfering with the ablation process.

In a further preferred implementation form of the first aspect, the measuring unit is configured to measure the z-position of the point of incidence of the fluid jet on the workpiece by measuring a characteristic length of the fluid jet.

For instance, the measuring unit may interferometrically measure a characteristic length of the fluid jet with the laser light guided in the fluid jet. The characteristic length may be defined by a certain measurement range. Changes of the measured characteristic length may provide a precise indication about, for instance, the complete length of the fluid jet between machining unit and workpiece, and thus about the z-position of the point of incidence of the fluid jet on the workpiece.

In a further preferred implementation form of the first aspect, the measuring unit is configured to measure the z-position of the point of incidence of the fluid jet on the workpiece through the fluid jet.

In particular, the measuring unit may for instance send electromagnetic radiation or acoustic waves through the fluid jet onto the workpiece. The electromagnetic radiation or acoustic waves are accordingly guided by the fluid jet precisely to the workpiece x-y-position of which the z-position is to be measured. The reflected electromagnetic radiation or acoustic waves may also be guided in the fluid jet back to the measuring unit. Based on, for instance, a time distance between sending and receiving the electromagnetic radiation or the acoustic waves, the z-position of the point of incidence of the fluid jet on the workpiece can be determined with high accuracy. Accordingly, a very precise ablation process is enabled.

In a further preferred implementation form of the first aspect, the measuring unit is integrated into the machining unit.

Thus, the apparatus becomes very compact and has the inherent ability to measure the z-position of the point of incidence of the fluid jet on any part of the workpiece.

A second aspect of the present invention provides a method for 3D shaping of a workpiece by material ablation with a laser beam, the method comprising providing a pressurized fluid jet onto the workpiece and coupling the laser beam into the fluid jet towards the workpiece, setting an x-y-z-position of the workpiece relative to the fluid jet, measuring a z-position of the point of incidence of the pressurized fluid jet on the workpiece.

Advantageously, the method further comprises adjusting the energy of the laser beam based on a set x-y-z-position and a measured z-position of the point of incidence of the pressurized fluid jet on the workpiece.

In a preferred implementation from of the second aspect, the method comprises coupling the laser beam pulsed into the fluid jet, setting the x-y-z-position of the workpiece for each laser pulse, measuring the z-position of the point of incidence of the fluid jet before each laser pulse, and adjusting individually the energy of each laser pulse based on the x-y-z position set for that laser pulse and the z-position of the point of incidence of the pressurized fluid jet on the workpiece measured before that laser pulse.

In a further preferred implementation form of the second aspect, the method comprises scanning the surface of the workpiece in the x-y-plane, and determining a profile of the surface by measuring z-positions of a plurality of points of incidence of the fluid jet on the workpiece, and setting individually the energy of each laser pulse and/or a trajectory of moving the workpiece by changing the x-y-z-position after each laser pulse based on the determined profile of the surface.

The method of the second aspect provides the same effects and advantages that are described above for the apparatus of the first aspect. Notably, the method of the second aspect may be developed with implementation forms according to the implementation forms described above for the apparatus of the first aspect. The method may be carried out by the apparatus of the first aspect.

BRIEF DESCRIPTION OF DRAWINGS

The above-described aspects and preferred implementation forms of the present invention are explained in the following description of specific embodiments in relation to the enclosed drawings, in which.

DETAILED DESCRIPTION OF THE DRAWINGS

Figure 1:
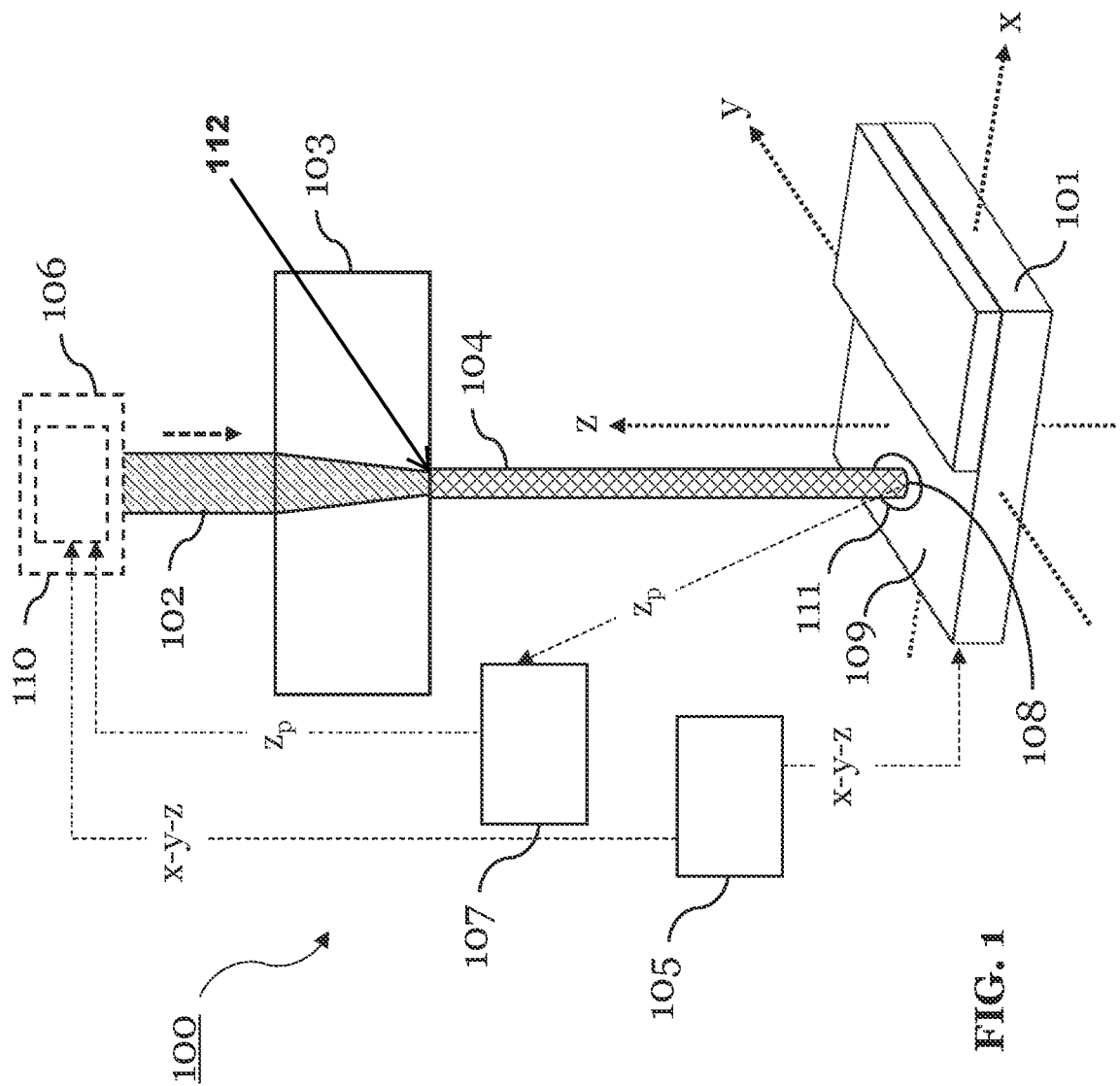
FIG. 1 shows an apparatus according to an embodiment of the present invention.

FIG. 1 shows an apparatus 100 according to an embodiment of the invention. In particular, FIG. 1 shows an apparatus 100 that is configured to shape a workpiece 101 by material ablation with a laser beam 102 in up to three dimensions (full 3D shaping). To this end, the apparatus 100 comprises at least a machining unit 103, a motion controller 105, and a measuring unit 107. Preferably, the apparatus 100 further comprises a laser controller 106 that controls a laser source 110 generating the laser beam 102. Thereby, the laser source 110 is part of the apparatus 100. The laser controller 106 and laser source 110 are shown in dotted lines in FIG. 1.

The machining unit 103 is configured to provide a pressurized fluid jet 104, wherein the fluid is preferably water, onto the workpiece 101, and to couple the laser beam 102 into the fluid jet 104 towards the workpiece 101. The laser beam 102 is in particular a high-intensity laser beam that is suitable for cutting and shaping materials including but not limited to metals, ceramics, diamonds, semiconductors, alloys, superalloys, or ultra-hard materials. The laser beam 102 may exemplarily have a laser power of between 1-2000 W.

The motion controller 105 is configured set an x-y-z-position of the workpiece 101 relative to the machining unit 103, i.e. to control movements of the workpiece 101 in three dimensions. To this end, the motion controller 105 may either move the workpiece 101 or the machining unit 103 or a combination of moving the workpiece 101 and the machining unit 103. The workpiece 101 may be positioned on a machining surface, which may or may not be part of the apparatus 100. In either case, the apparatus 100 is arranged such that it is able to machine the workpiece 101 disposed on the machining surface. As shown in FIG. 1, the motion controller 105 may provide the x-y-z-position that is to be set to a movable machining surface, on which the workpiece 101 is disposed, and the machining surface may then take this position within a pre-calibrated axis (coordinate) system.

The measuring unit 107 is configured to measure a z-position $z_p$ of the point of incidence 108 of the pressurized fluid jet 104 (and thus also of the laser beam 102) on the workpiece 101 in the z-direction. The point of incidence 108 may be on the workpiece surface 109 or may lie beneath the workpiece surface 109 e.g. if the laser beam 102 has already ablated workpiece material at this x-y-position. That is, the point of incidence 108 can be in a trench or in an indentation 111 in the workpiece surface 109 as indicated in FIG. 1. The measuring unit 107 may be referred as a depth sensor, since the measured position $z_p$ indicates the z-position of the material ablation, i.e. the depth at which the workpiece is machined by the laser beam 102. The measuring unit 107 is preferably able to measure multiple positions $z_p$ of points of incidence 108 in the z-direction, in particular if the fluid jet 104 is moved along the workpiece surface 109. In this way the measuring unit 107 is able to measure a precise surface profile of the workpiece 101. Notably, the propagation direction of the fluid jet 104 is preferably along the vertical direction, but can also be at an angle to the vertical direction. Since the fluid jet 104 is pressurized, the fluid jet 104 will always propagate linearly. The z-direction can be parallel to the vertical direction and/or to the propagation direction of the fluid jet 104, but does not have to be. The x-y-plane is in general perpendicular to the z-direction.

The optional but preferred laser controller 106 is configured to provide the laser beam 102 to the machining unit 103. The laser controller 106 is preferably provided with the x-y-z-position of the workpiece 101 set by the motion controller 105. Furthermore, the laser controller 106 may be provided with the z-position of the most recently measured point of incidence 108 on the workpiece 101. Preferably, the laser controller 106 may then adjust a laser power of the laser beam 102 based on the x-y-z-position set by the motion controller 105 and/or based on one or more z-positions $z_p$ measured by the measuring unit 107.

Advantageously, the laser beam 102 used by the apparatus 100 may be pulsed. To this end, the laser source 110 may be configured to provide a pulsed laser beam 102, and preferably the laser controller 106 is configured to control pulse width, amplitude, rate etc. In this case, the laser controller 106 may preferably be configured to adjust the energy of each laser pulse 200 based on the x-y-z-position set by the motion controller 105 for said laser pulse 200, and based on the z-position $z_p$ of the point of incidence 108 of the pressurized fluid jet 104 on the workpiece 101 measured by the measuring unit 107 before said laser pulse 200. In this way, the laser-induced ablation of workpiece material may individually be adjusted for each laser pulse 200, particularly in a fast and direct way. Thus, precise 3D-shaping of the workpiece 101 is possible. In particular, if the laser controller 106 and the motion controller 105 both allow high-speed operation, very precise 3D contours can be generated in a speed and precision superior to any known technique.

Figure 2:
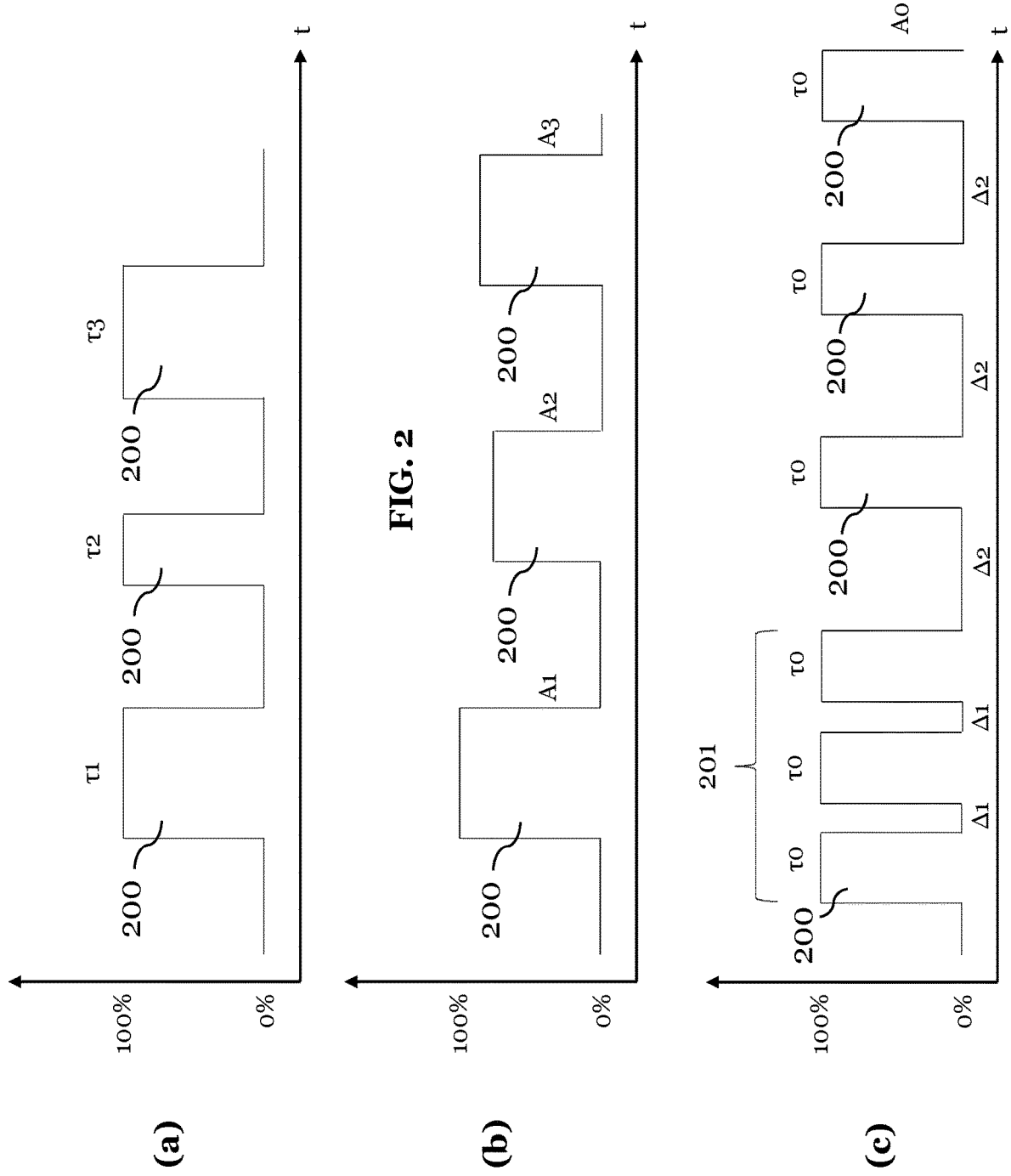
FIG. 2 shows possibilities to control the energy of a laser pulse by an apparatus according to an embodiment of the present invention.

FIG. 2 shows how the energy of one or more laser pulses 200 may be controlled by the apparatus 100, particularly by means of the laser controller 106. FIG. 2(a) shows that the laser controller 106 may be configured to set a laser pulse width. In FIG. 2(a) all the laser pulses 200 are shown having an amplitude of 100%, but the laser pulses 200 have different widths (i.e. durations), which are labelled $\tau 1$, $\tau 2$ and $\tau 3$. Accordingly, the energy provided by each laser pulse 200 is different.

FIG. 2(b) shows that the laser controller 106 may also be configured to set an amplitude of each laser pulse 200. Again, three laser pulses 200 are shown. However, only the first laser pulse 200 has an amplitude A1 of 100%, The other laser pulses 200 have a lower amplitude A2 or A3, respectively. Accordingly, the laser pulse energy of each laser pulse 200 is different.

FIG. 2(c) shows that the laser controller 106 may also control a pulse rate and in consequence a time delay between consecutive pulses 200. Further, the laser controller 106 may even be configured to execute a pulse burst 201. The first three pulses 200 (left-hand side of FIG. 2(c)) compose a pulse burst 201 and have accordingly shorter time delays $\Delta 1$ between the consecutive pulses 200. The pulses 200 may all have an equal pulse width of $\tau 0$. In contrast, the second three laser pulses 200 (right-hand side of FIG. 2(c)) have a larger time delay $\Delta 2$ between the consecutive pulses 200, i.e. the pulse rate for these laser pulses 200 is lower. Accordingly, different energies per time are provided by the laser beam 102 with the pulse burst 201 and the other pulses 200, respectively.

Figure 3:
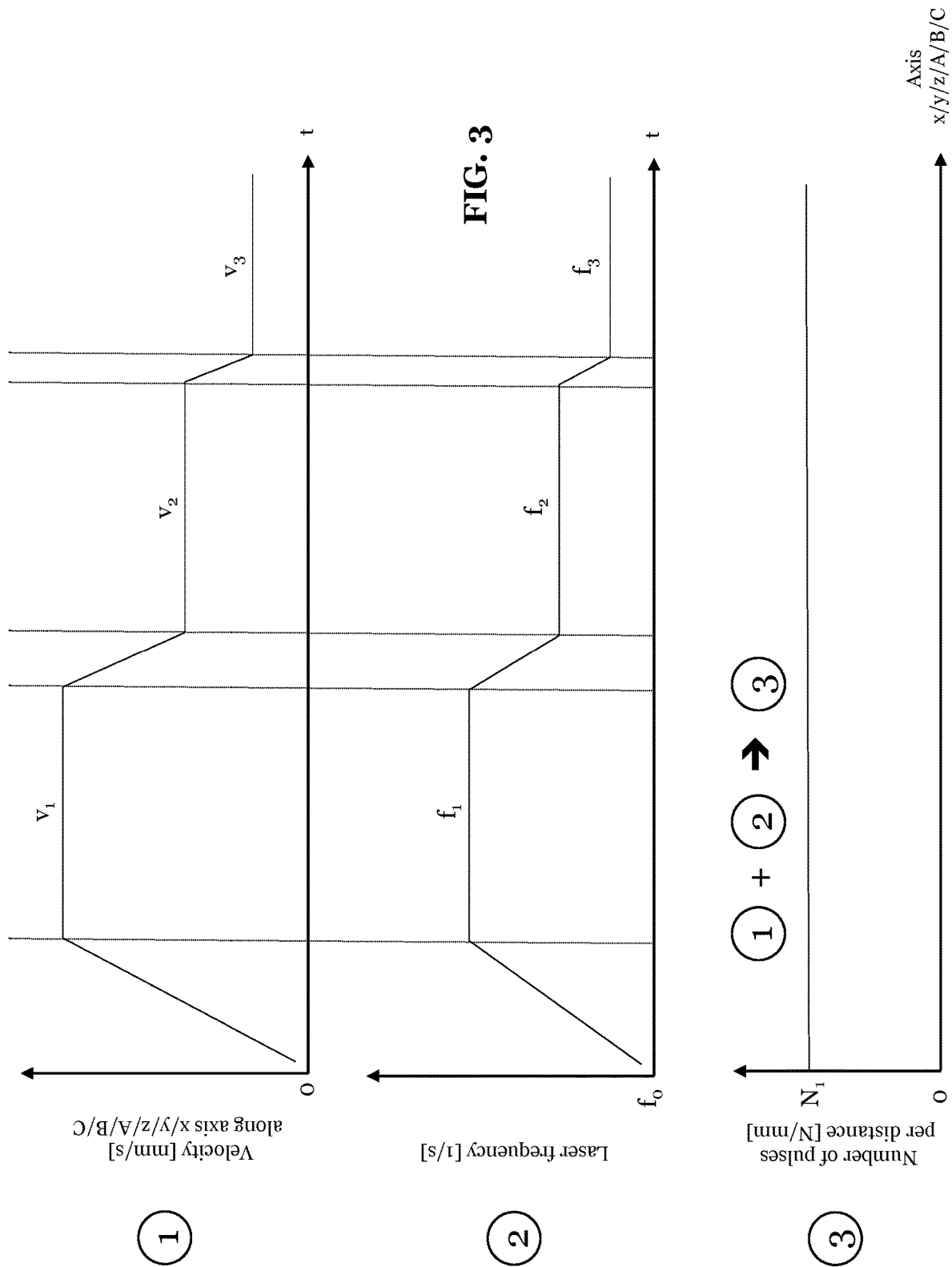
FIG. 3 shows an adaption of a laser frequency and number of laser pulses to a movement velocity of the workpiece by an apparatus according to an embodiment of the present invention.

Preferably, the motion controller 105 is further configured to change the x-y-z-position of the workpiece 101 relative to the machining unit 103. In particular, if the laser beam is pulsed, the motion controller 105 may change the position of the workpiece 101 after each laser pulse 200. Thereby, the workpiece position may be changed stepwise or continuously. It is also possible that the motion controller 105 accelerates or decelerates the changing of the x-y-z-position of the workpiece 101 while moving the workpiece 101 along a trajectory. This is shown in FIG. 3(1), wherein the velocity of the workpiece 101 movement changes over time. The workpiece may specifically be moved along the x-, y-, z-axis, or along rotational directions A, B, C.

The laser controller 106 may be configured to increase or decrease a laser pulse frequency (as shown in FIG. 3(2)) such that a number of laser pulses 200 per distance is constant along the trajectory of movement (shown in FIG. 3(3)). The motion controller 105 may therefore give information to the laser controller 106 that the number of pulses 200 along the trajectory should stay constant in any acceleration and deceleration phase of the axis system. However, the motion controller 105 could also inform or instruct the laser controller 106 to adapt the number of pulses 200 depending on the velocity, for example, to provide more pulses 200 when a rotational movement with a radius of e.g. less than 1 mm is carried out. The scheme of FIG. 3 is further not only applicable with respect to the laser frequency (pulse rate), but also with the other options of adapting the laser energy that are shown in FIG. 2.

The apparatus 100 can also be configured in such a way with a fast laser switch control, that the axis system determines a surface scan of the workpiece 101—as shown in and explained below with respect to FIG. 7—and the laser beam 102 for ablation is only activated in some areas of the surface scan in function of the actual position of the workpiece 101 versus the machining unit 103 during a continuous motion. This is possible thanks to a fast output of the x-y-z-position by the motion controller 105. In the above manner, the apparatus 100 does not need to compensate the frequency of the laser and has the advantage to ablate material at constant speed (meaning constant depth) and to process faster.

Figure 4:
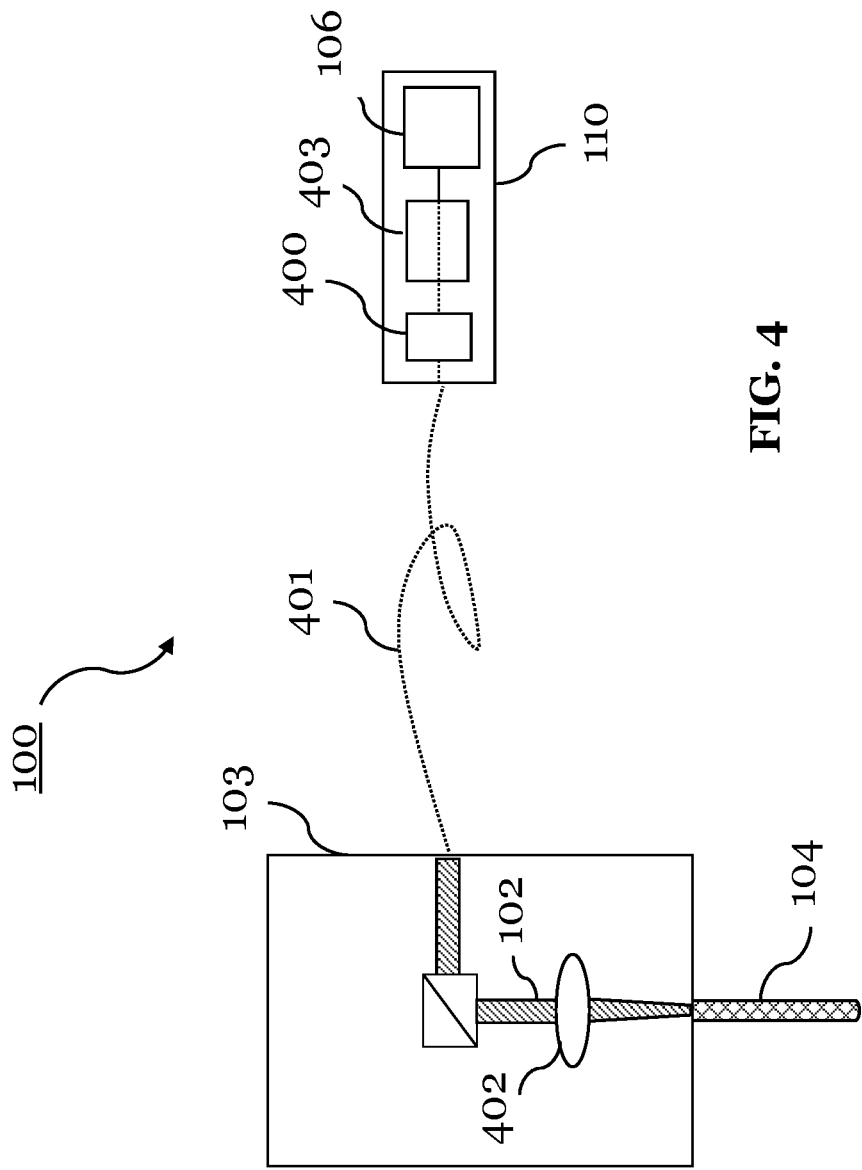
FIG. 4 shows an apparatus according to an embodiment of the invention.

FIG. 4 shows an apparatus 100 according to an embodiment of the invention, which builds on the apparatus 100 shown in FIG. 1. Same components in FIG. 1 and FIG. 4 have the same reference signs and function likewise. The apparatus 100 of FIG. 4 also has the machining unit 103, and has the laser source 110 that provides the laser beam 102 to the machining unit 103. Thereby, the laser beam 102 may be provided from the laser source 110 to the machining unit 103 by means of an optical fiber 401. In the machining unit 103, the laser beam 102 may be coupled into the fluid jet 104 directly or preferentially by one or more optical elements 402. This optical element 402 may be a lens or a lens assembly or any other suitable element to focus the laser beam into the fluid jet. The machining unit 103 may also contain other optical elements, for instance, a beam splitter, mirror, grating, filter or the like, in order to guide the laser beam 102 from the edge of the machining unit 103 to the at least one optical element 402. The machining unit 103 may further include an optically transparent protection window (not shown), in order to separate the optical arrangement (here the optical element 402) from a fluid circuit and region of the machining unit 103 where the fluid jet 104 is produced. Typically, the fluid jet 104 is produced by a fluid jet generation nozzle 112 that has a fluid nozzle aperture, and the produced fluid jet 104 is output from the machining unit 103 via the nozzle 112.

The laser source 110 includes the laser controller 106 and a laser resonator 403. If the laser beam 102 is a pulsed laser beam, the laser source 110 may include a switch 400 for modulating the laser pulses 200. In a preferred implementation, this switch 400 is a Q-switch for providing particular fast 0-100% modulation capabilities. The switch 400 is controlled by the laser controller 106.

FIG. 5(a) shows an apparatus 100 according to an embodiment of the invention, which builds on the apparatus 100 shown in FIG. 1. Same components in FIG. 1 and FIG. 5(a) have the same reference signs and function likewise. Particularly, FIG. 5(a) shows the machining unit 103 of the apparatus 100, and the fluid jet 104 that guides the laser beam 102 onto the workpiece 101. The apparatus 100 of FIG. 5(a) has the measuring unit 107 advantageously integrated into the machining unit 103. In this way, the measuring unit 107 may be configured to measure the z-position of the point of incidence 108 of the fluid jet 104 on the workpiece 101 through the fluid jet 104. This allows for a compact apparatus 100 and at the same time for a precise and fast measurement of the z-position at a certain x-y-position of the workpiece 101. FIG. 5(a) indicates that the z-position currently measured is in an indentation 111 in the workpiece surface 109, i.e. it is below the workpiece surface 109 in the z-direction. However, the measuring unit 107 can likewise measure a z-position of a point of incidence 108 of the fluid jet 104 on the workpiece surface 109.

The measuring unit 107 may be configured to measure the z-position by using electromagnetic radiation or acoustic waves. The measuring unit 107 may emit the electromagnetic radiation or the acoustic waves so that it is guided in the fluid jet 104 by means of total reflection onto the workpiece 101. Likewise, the measuring unit 107 may receive a reflection of the electromagnetic radiation or the acoustic waves, respectively. These reflected signals may also be carried in the fluid jet 104 towards the measuring unit 107. By evaluating, for instance, a time difference between the sending and receiving of corresponding signals, the measuring unit 107 can calculate the z-position of the point of incidence 108. The measuring unit 107 may from this z-position also derive is a length of the fluid jet 104, for instance the complete length l between the machining unit 103 and the workpiece surface 109 or indentation 111 in the workpiece surface 109 as shown in the figure.

FIG. 5(b) shows at what point in time the measuring unit 107 is preferably configured to measure the z-position of the point of incidence 108 of the fluid jet 104 on the workpiece 101, namely within a time period between two subsequent laser pulses 200 (see the dotted lines). In other words, the measuring unit 107 may measure the z-position after and before each laser pulse 200, respectively. During providing a laser pulse 200, preferably no measurement is carried out. In this way, the measurements performed by the measuring unit 107 do not interfere with the material ablation caused by the laser pulses 200.

Notably, it is also possible that the measuring unit 107 scans and measures the complete workpiece surface 109 before the apparatus starts providing the laser beam 102 or the laser pulses 200 onto the workpiece 101 for ablating material. For instance, the apparatus 100 may be configured to shape the workpiece 101 by ablating layer-by-layer a plurality of layers of workpiece material with the laser beam 102. In this case, the measuring unit 107 could be configured to scan the workpiece surface 109 with the electromagnetic radiation or acoustic waves before each layer, and thereby determine a surface profile. Based on the determined surface profile, the laser controller 106 may then adjust the energy of the laser beam 102 or individual laser pulses 200, respectively, for controlled ablation of the next layer.

Figure 5:
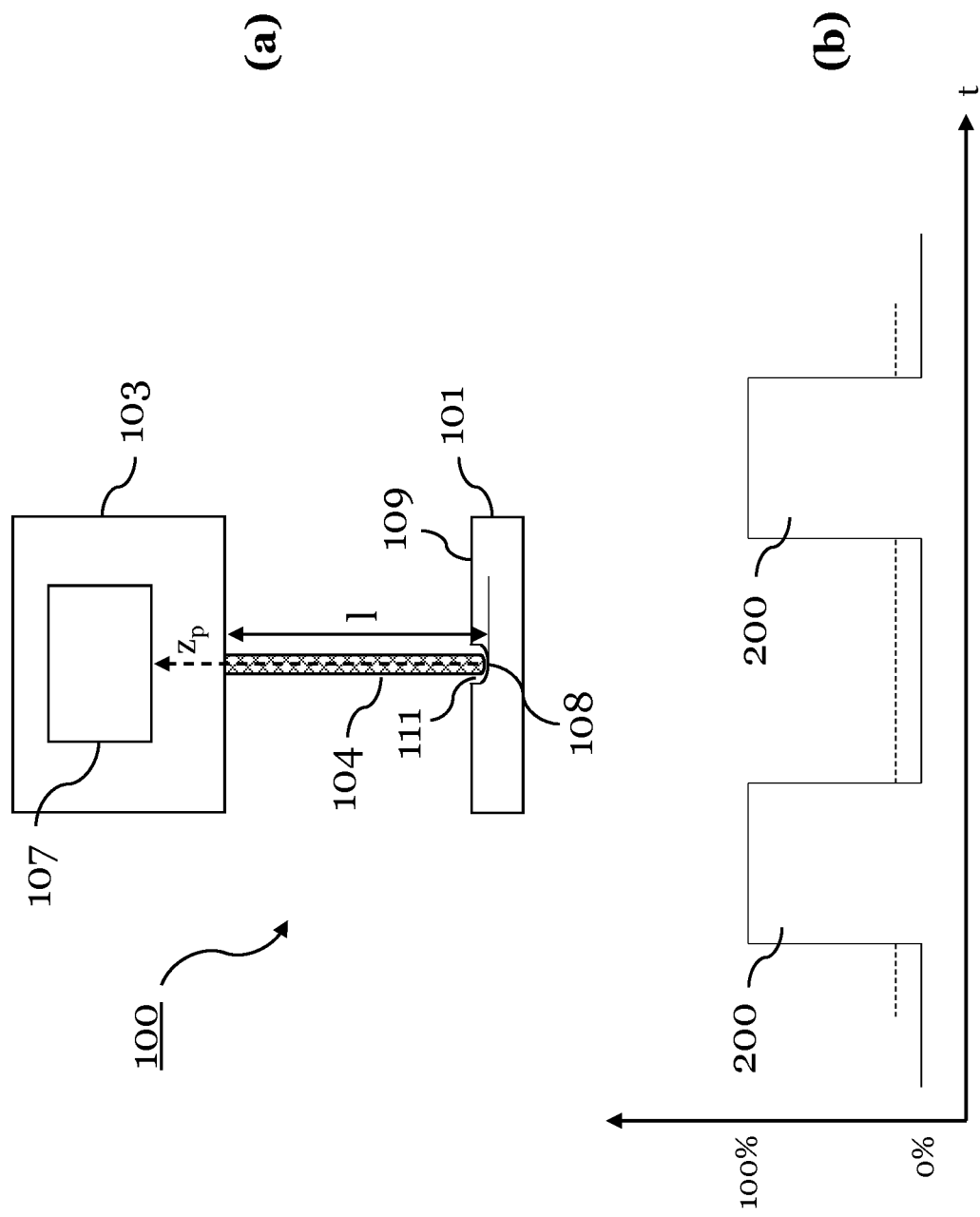
FIG. 5 shows (a) an apparatus according to an embodiment of the invention, and (b) a measurement scheme of the z-position in between two laser pulses.
Figure 6:
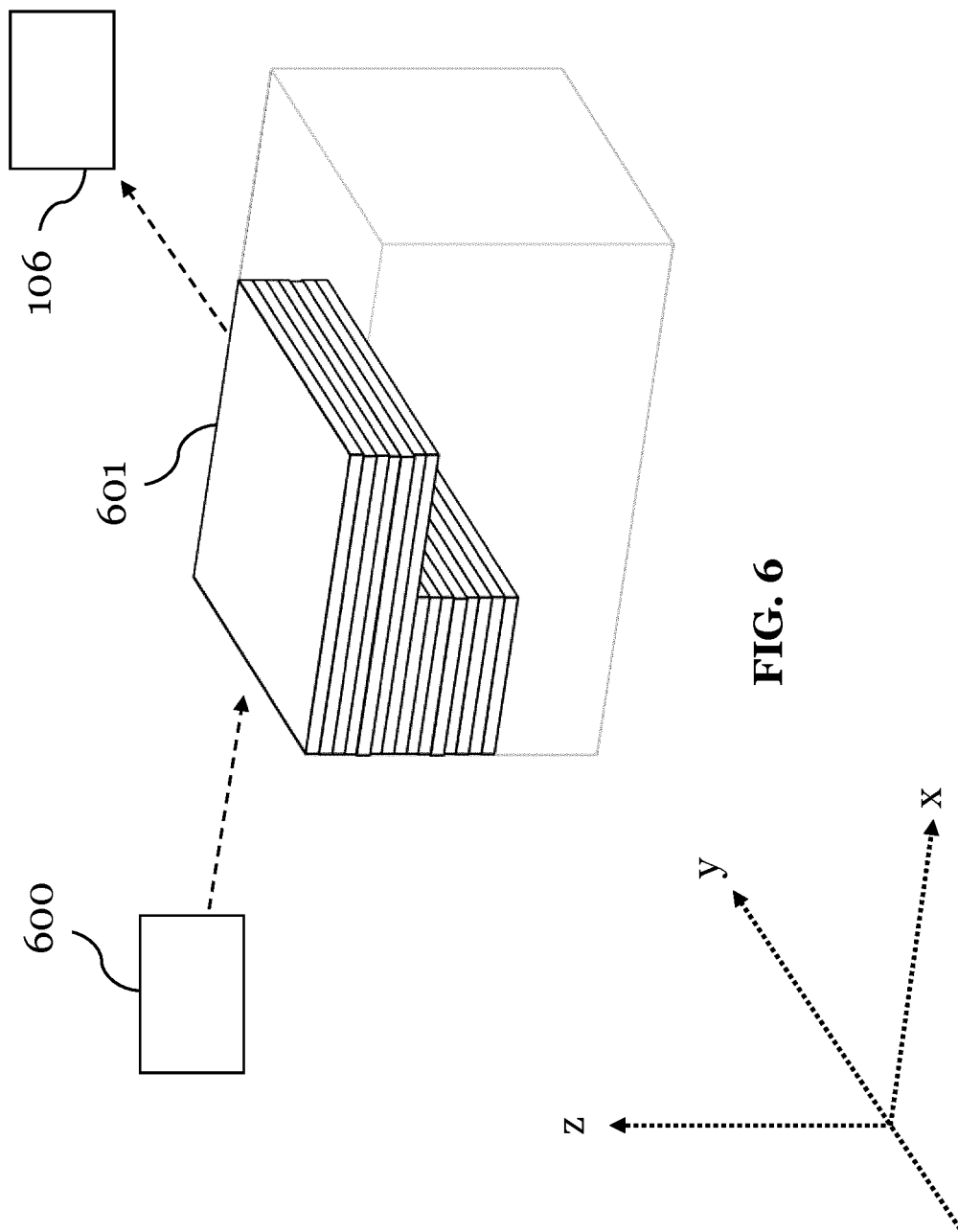
FIG. 6 shows a layered representation of the to-be-ablated volume as calculated in an apparatus according to an embodiment of the invention.

FIG. 6 shows a further advantageous unit, which may be included in an apparatus 100 according to an embodiment of the invention as shown in FIG. 1, 4 or 5(a). In particular, the apparatus 100 may further comprise a processing unit 600 configured to calculate a layered representation 601 of the to-be-ablated volume of the workpiece 101, i.e. the volume of material represented by multiple layers that is to be removed from the initial workpiece 101 to reach the shape of the final part. The apparatus 100 may then generally be configured to shape the workpiece 101 based on the calculated layered representation 601. For creating the layer representation 601, a Computer-Aided Design (CAD) approach may be employed. The layered representation 601 includes a plurality of layers and a defined thickness of the layer, the sum of these layers yielding the volume that has to be ablated from the workpiece 101. The layers can indicate the amount of material that is to be ablated with each complete surface scan of the workpiece 101. The layered representation 601 can be provided by the processing unit 600 to the laser controller 106, and the laser controller 106 may then be configured to control the energy of the laser beam 102 or of each individual laser pulse 200, respectively, based on the layered representation 601 in order to achieve the defined thickness of each layer.

Figure 7:
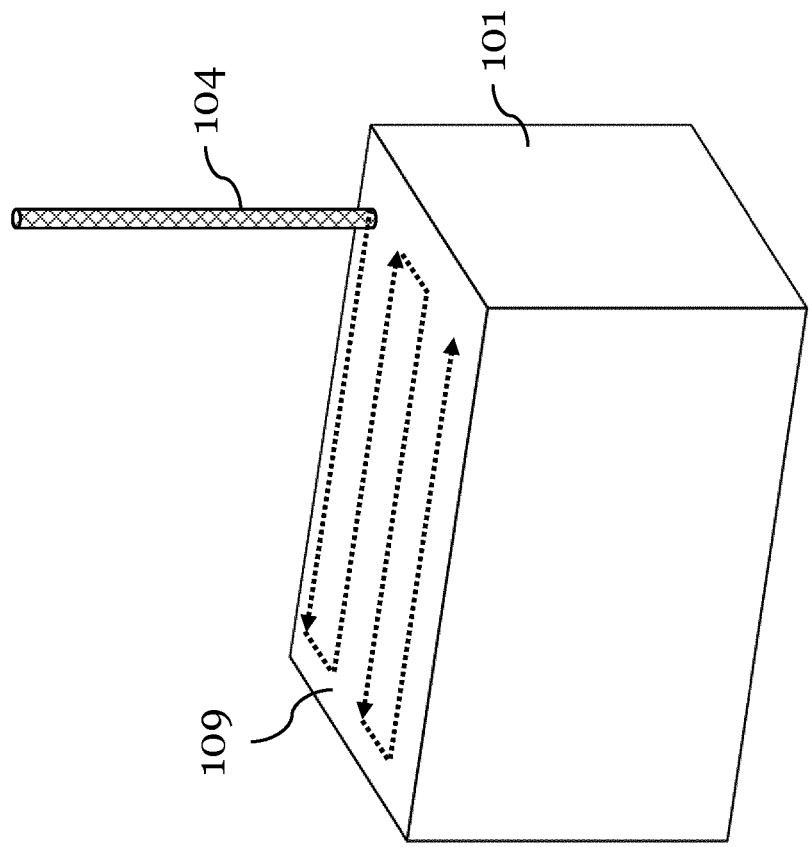
FIG. 7 shows the scanning of the workpiece surface with a laser beam coupled into a fluid jet performed in an apparatus according to an embodiment of the invention.

FIG. 7 shows how the apparatus 100 implements a surface scan of the workpiece 101 with the fluid jet 104 guiding the laser beam 102 (or not, if the surface 109 is to be measured while not ablating material). To this end, the motion controller 105 may be configured to change the x-y-position of the workpiece 101 such that the fluid jet 104 and/or laser beam 102 scans the workpiece surface 109 in the x-y-plane, which may be the horizontal plane. The surface scan may be carried out line-by-line, column-by-column or in any other suitable manner. In particular, the motion controller 105 may be configured to change the position of the workpiece 101 after each laser pulse 200 (in case that the laser beam 102 is pulsed), With each surface scan, material can be ablated from the workpiece 101 if the laser beam energy is set correctly. For instance, the laser beam 102 or each laser pulse 200 may be provided with energies such that 1-1000 μm depth of workpiece material is ablated in the z-direction at a given x-y-z-position of the workpiece 101. In this way, each complete scan of the workpiece surface 109 can ablate a layer with a thickness of 1-1000 μm. The ablated layer may be uniform or non-uniform in its thickness along the z-direction. A surface scan may also be carried out without ablating material if the laser beam energy is set low enough or if the laser beam 102 is turned off. With such a scan, the measuring unit 107 may measure a profile of the workpiece surface 109.

Figure 8:
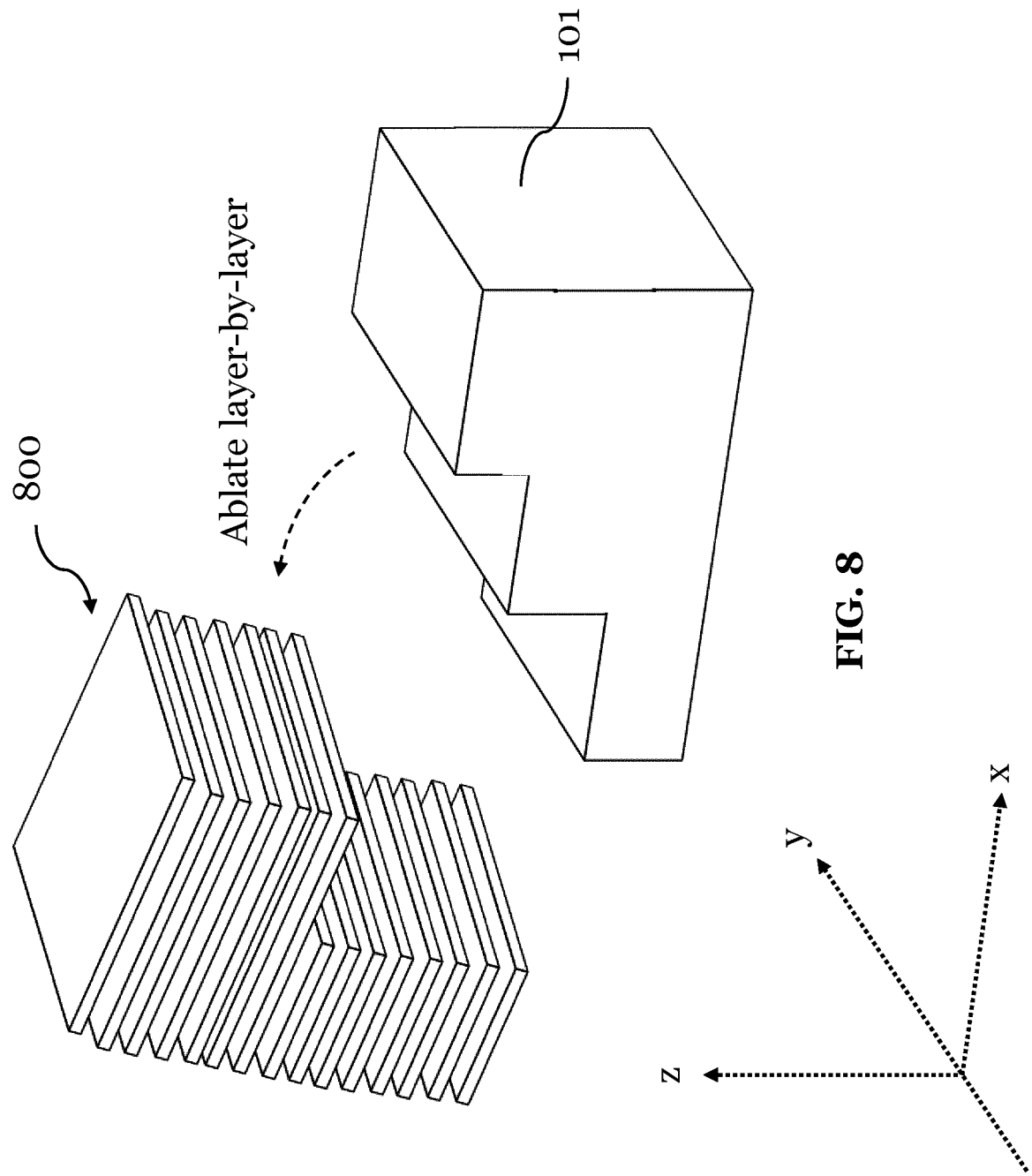
FIG. 8 shows a layer-by-layer ablation of workpiece material by an apparatus according to an embodiment of the invention.

FIG. 8 illustrates how the apparatus 100 is configured to shape the workpiece 101 by ablating a plurality of layers 800 of workpiece material particularly layer-by-layer. The plurality of layers 800 may be identical to the calculated layered representation 601 shown in FIG. 6. Each of the plurality of layers 800 may have a predetermined area in the x-y-plane, which depends on the x-y-positions that the motion controller 105 sets. Preferably, the motion controller 105 sets the x-y-z-positon of the workpiece based on the layered representation 601. Each layer 800 may have an individual uniform or non-uniform thickness along the z-direction, wherein the thickness depends on the laser energies that the laser controller 106 has set for each x-y-z-position of the workpiece 101 relative to the machining unit 103. For each x-y-z-position of the workpiece 101, the apparatus 100 is configured to determine the z-position of the point of incidence 108 of the fluid jet 104 on the workpiece 101, and to adjust the laser power accordingly, so that at each workpiece position a certain depth of workpiece material is ablated in the z-direction.

Figure 9:
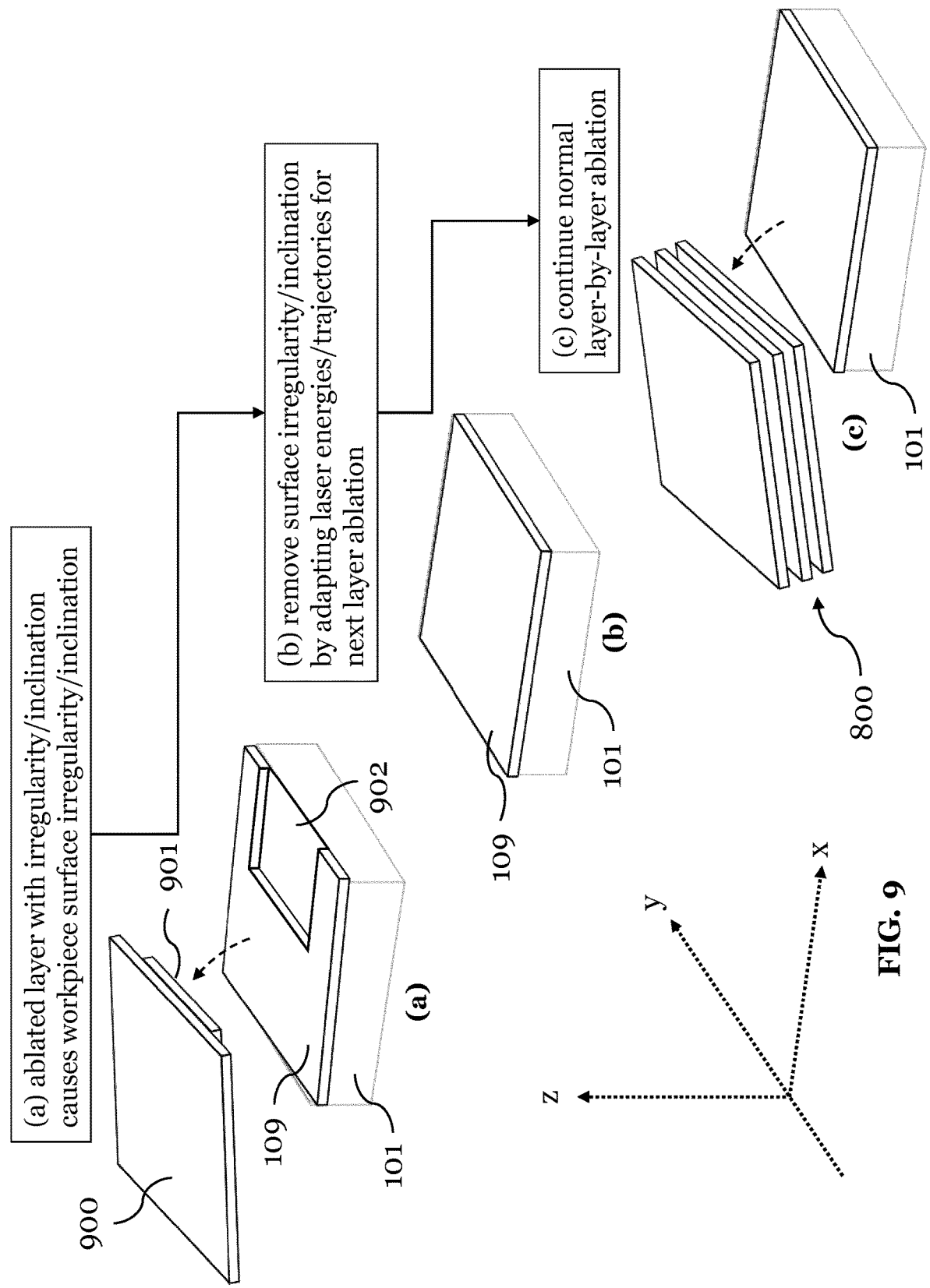
FIG. 9 shows a correction of a surface inclination and/or irregularity performed by an apparatus according to an embodiment of the invention.

FIG. 9 shows that the apparatus 100 according to an embodiment of the invention—as shown in FIG. 1, 4 or 5(*a*), is also able to correct inclinations and/or irregularities that unintentionally occur during ablating workpiece material. If such an inclination and/or irregularity is not corrected in time, the error can add up with each layer 800, and can lead to an imprecise 3D shape of the final part. In particular, the measuring unit 107 is thus configured to determine an inclination and/or irregularity 901 of a lastly ablated workpiece material layer 900. This can, for instance, be done by measuring the depth after each laser pulse or by scanning the workpiece surface 109 in the x-y-plane (e.g. without material ablation), and thereby determining z-positions of a plurality of points of incidence 108 of the fluid jet 104 on the workpiece 101. Thereby, an inclination and/or surface irregularity 902 on the surface 109 of the workpiece 101 can be determined, from which the inclination/irregularity 901 can be calculated. This is shown in FIG. 9(*a*).

The apparatus 100 may then be configured to ablate at least the next layer 800 based on the determined inclination and/or irregularity 901 of the last ablated layer 900. Accordingly, the surface irregularity and/or inclination 902 can be removed with ablating at least the next layer 800. To this end, the apparatus 100 is configured to adapt laser energies or trajectory of moving the workpiece 101, the movement of the workpiece 101 being caused by repeatedly changing the x-y-z-position set by the motion controller 105. This causes also an adaption of a trajectory, along which the fluid jet 104 moves over the workpiece 101, for the ablation of at least the next layer 800. In other words, the laser controller 106 may be configured to adapt the laser beam 102 energy for different x-y-positions or adapt individually the energy of each laser pulse 200. Additionally (or optionally) the motion controller 105 may also adapt a trajectory of the pressurized fluid jet 104, in order to remove material only or predominantly at certain positions on the workpiece surface 109, for instance where a surface irregularity 902 is. The adaption of the laser energies and/or of the trajectory of moving the workpiece 101 and/or of the angle of incidence of the fluid jet 104 on the workpiece 101 is preferably carried out based on the determined inclination and/or irregularity 901 (or based on the surface inclination and/or irregularity 902 on the workpiece surface 109). The apparatus 100 can in this way remove the inclination and/or irregularity 902 starting with the next ablated layer 800. It may take several layers 800 to remove the irregularity and/or inclination. After successful removal, the normal layer-by-layer ablation can continue.

Figure 10:
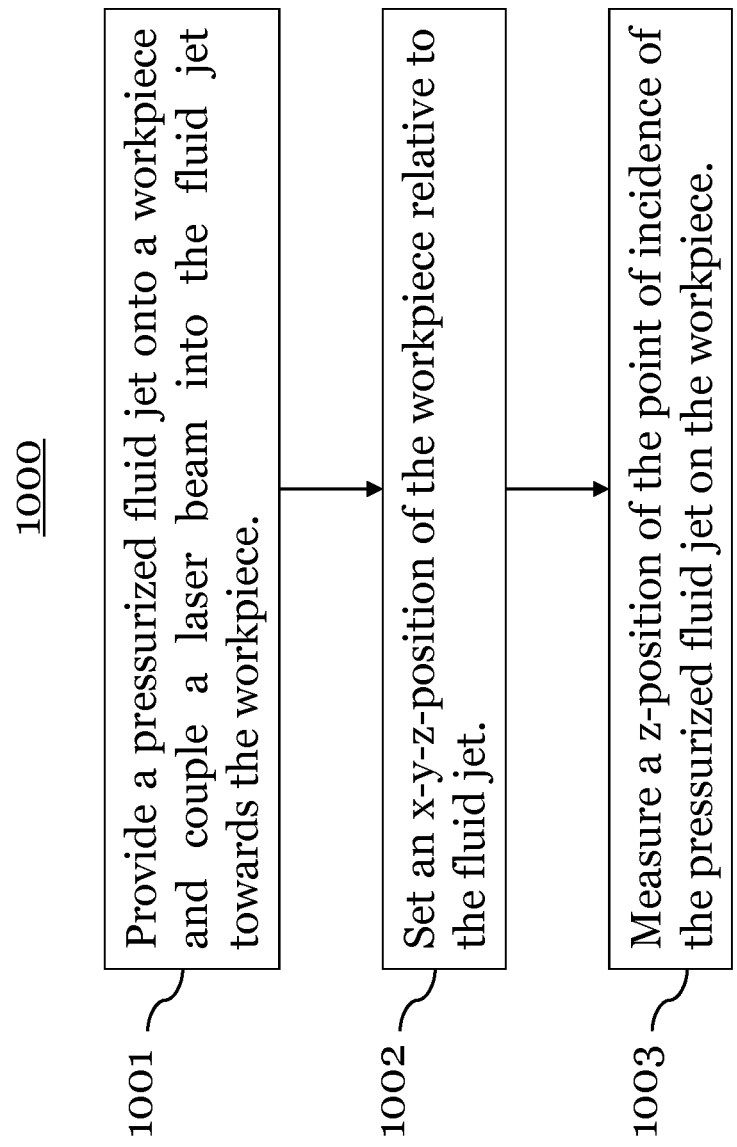
FIG. 10 shows a method according to an embodiment of the invention.

FIG. 10 shows a method 1000 for 3D shaping of a workpiece 101 by material ablation with a laser beam 102. The method 1000 contains a first step 1001 of providing a pressurized fluid jet 104 onto a workpiece 101, and coupling a laser beam 102 into the fluid jet 104 towards the workpiece 101. Further, the method 1000 includes a second step 1002 of setting an x-y-z-position of the workpiece 101 relative to the fluid jet 104. Finally, the method 1000 at least includes a third step 1003 of measuring a z-position of the point of incidence 108 of the pressurized fluid jet 104 on the workpiece 101.

The method 1000 may include further steps according to the above-described functions of the apparatus 100. The method 1000 may particularly be carried out by the apparatus 100. Preferably, the method 1000 includes providing a pulsed laser beam 102 and adjusting individually the energy of each laser pulse 200 based on the x-y-z-position set for said laser pulse 200 and the z-position of the point of incidence 108 of the pressurized fluid jet 104 on the workpiece 101 measured before said laser pulse 200.

The present invention has been described in conjunction with various embodiments as examples as well as implementation forms. However, other variations can be understood and effected by those persons skilled in the art and practicing the claimed invention, from the studies of the drawings, the description and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method (1000) for 3D shaping of a workpiece (101) by material ablation with a laser beam (102) comprising a plurality of laser pulses, the method (1000) comprising the steps of:
providing (1001) a pressurized laminar fluid jet (104) produced by a nozzle of an apparatus onto the workpiece (101) and coupling the laser beam (102) into the pressurized laminar fluid jet (104) which guides the laser beam towards the workpiece (101),
moving a machining surface of the apparatus, on which the workpiece (101) is provided, relative to the nozzle according to x-y-z coordinates of the machining surface set in a motion controller of the apparatus, and
performing (1003) a measurement of a z-coordinate of a point of incidence (108) of the pressurized laminar fluid jet (104) on the workpiece (101) at the set x-y-z-coordinates of the machining surface,
wherein the measurement is performed by a measuring unit comprising a depth sensor of the apparatus through the pressurized laminar fluid jet, and
wherein a z-direction is parallel to a propagation direction of the pressurized laminar fluid jet (104),
scanning a surface (109) of the workpiece (101) in a x-y-plane,
determining a profile of the surface (109) by measuring respective z-coordinates of a plurality of points of incidence (108) of the pressurized laminar fluid jet (104) on the workpiece (101),
ablating a layer of material of the workpiece, wherein the ablating comprises setting individually an energy of each laser pulse (200) or setting a trajectory of moving the workpiece (101) by changing the x-y-z coordinates of the machining surface after each laser pulse (200) based on the determined profile of the surface (109), and
calculating a layered representation (601) of a to be ablated volume of the workpiece, wherein the workpiece (101) is shaped by ablating, layer-by-layer, a plurality of layers (800) of workpiece material with the laser beam (102).

2. The method (1000) of claim 1, wherein a laser controller (106) is configured to increase or decrease a laser pulse frequency, respectively, such that a number of laser pulses (200) per distance is constant along the trajectory.

3. The method (1000) of claim 1 further comprising the step of determining a first inclination or surface irregularity (901) of a lastly ablated workpiece material layer (900) by scanning the workpiece surface (109) in the x-y-plane and thereby measuring z-positions of the plurality of points of incidence (108) of the pressurized laminar fluid jet (104) on the workpiece (101) and a second inclination or surface irregularity (902) on the surface (109) of the workpiece (101).

4. An apparatus (100) for 3D shaping of the workpiece (101) by material ablation with the laser beam (102) for carrying out the steps of claim 1, the apparatus (100) comprising a machining unit (103) configured to provide the pressurized laminar fluid jet (104) onto the workpiece (101) and to couple the laser beam (102) into the pressurized laminar fluid jet (104) towards the workpiece (101), a motion controller (105) configured to set an x-y-z-position of the workpiece (101) relative to the machining unit (103), the measuring unit (107) configured to measure a z-position of the point of incidence (108) of the pressurized laminar fluid jet (104) on the workpiece (101) in the z-direction.

5. The apparatus (100) according to claim 4, further comprising a laser controller (106) configured to adjust a power or energy of the laser beam (102) based on the x-y-z-position set by the motion controller (105) and the z-position of the point of incidence (108) of the pressurized laminar fluid jet (104) on the workpiece (101) measured by the measuring unit (107).

6. The apparatus (100) according to claim 4, wherein the laser beam (102) is pulsed, and the apparatus (100) further comprises a laser controller (106) configured to adjust individually the energy of each laser pulse (200) based on the x-y-z-position set by the motion controller (105) for that laser pulse (200) and the z-position of the point of incidence (108) of the pressurized laminar fluid jet (104) on the workpiece (101) measured by the measuring unit (107) before that laser pulse (200).

7. The apparatus (100) according to claim 6, wherein the measuring unit (107) is configured to determine an ablation result of each laser pulse (200) at the z-position of the point of incidence (108) of the pressurized laminar fluid jet (104) on the workpiece (101) measured by the measuring unit (107) after that laser pulse (200), and the laser controller (106) is configured to adjust an energy of the next laser pulse (200) based on the determined ablation result.

8. The apparatus (100) according to claim 6, wherein the laser controller (106) is configured to control the energy of each laser pulse (200) by setting its width or amplitude or by setting a pulse (200) rate and consequently a time delay between consecutive pulses (200) or by executing a pulse burst (201).

9. The apparatus (100) according to claim 8, wherein the laser controller (106) is configured to control the energy of each laser pulse (200) such that it ablates in z-direction between 1-1000 um depth of workpiece material at the x-y-z-position of the workpiece (101) set by the motion controller (105) for that laser pulse (200).

10. The apparatus (100) according to claim 6, further comprising a laser source (110) for generating the laser beam (102), the laser source (110) including the laser controller (106) and a fast switch, preferably a Q-switch (400), for modulating the laser pulses (200).

11. The apparatus (100) according to claim 6, wherein the measuring unit (107) is configured to measure the z-position of the point of incidence (108) of the pressurized laminar fluid jet (104) on the workpiece (101) within a time period between two subsequent laser pulses (200).

12. The apparatus (100) according to claim 6, wherein the motion controller (105) is configured to step-wise or continuously change the x-y-z-position of the workpiece (101) relative to the machining unit (103) after each laser pulse (200).

13. The apparatus (100) according to claim 12, wherein the motion controller (105) is configured to accelerate or decelerate the changing of the x-y-z-position of the workpiece (101) when moving the workpiece (101) along the trajectory.

14. The apparatus (100) according to claim 4, wherein the motion controller (105) is configured to repeatedly change the x-y-z-position of the workpiece (101) such that the laser beam (102) scans the workpiece surface (109) in the x-y-plane.

15. The apparatus (100) according to claim 14, configured to selectively activate or deactivate the laser beam (102) during the scan of the workpiece surface (109) depending on the x-y-z-positions given by the motion controller (105).

16. The apparatus (100) according to claim 2, configured to shape the workpiece (101) by ablating, layer-by-layer, a plurality of layers (800) of workpiece material with the laser beam (102), wherein each of the plurality of layers (800) takes an individually predetermined area in the x-y-plane and has an individually predetermined uniform or non-uniform thickness along the z-direction a processing unit (600) configured to calculate a layered representation (601) of the to be ablated volume of the workpiece (101), wherein the apparatus (100) is configured to shape the workpiece (101) by ablating the plurality of layers (800) of workpiece material based on the calculated layered representation (601) the laser controller (106) is configured to control the power or energy of the laser beam (102) based further on the layered representation (601) received from the processing unit (600).

17. The apparatus (100) according to claim 4, wherein the measuring unit (107) is configured to feedback a measured z-position of the point of incidence (108) of the pressurized laminar fluid jet (104) on the workpiece (101) to a processing unit (600), and the processing unit (600) is configured to recalculate the layered representation (601), particularly a number of layers of the layered representation (601), based on the feedback from the measuring unit (107).

18. The apparatus (100) according to claim 4, wherein a processing unit (600) is configured to recalculate the layered representation (601) after each workpiece material layer (800) that is ablated from the workpiece (101).

19. The apparatus (100) according to claim 4, wherein the measuring unit (107) is further configured to determine a first inclination or surface irregularity (901) of a lastly ablated workpiece material layer (900) by scanning the workpiece surface (109) in the x-y-plane and thereby measuring z-positions of the plurality of points of incidence (108) of the pressurized laminar fluid jet (104) on the workpiece (101) and a second inclination or surface irregularity (902) on the surface (109) of the workpiece (101), and the apparatus (100) is configured to ablate at least a next layer (800) based on the first inclination or surface irregularity (901) determined by the measuring unit (107).

20. The apparatus according to claim 3, configured to shape the workpiece (101) by ablating, layer-by-layer, the plurality of layers (800) of workpiece material with the laser beam (102) wherein the apparatus (100) is configured to ablate at least a next layer (800) based on the first inclination or surface irregularity (901) determined by the measuring unit (107), and the laser controller (106) is configured to adapt, for at least the next layer (800), individually the energy of each laser pulse (200) or a trajectory of moving the workpiece (101) by changing the x-y-z-position after each laser pulse (200) based on the first inclination or surface irregularity (901) determined by the measuring unit (107).

21. The apparatus (100) according to claim 4, wherein the measuring unit (107) is configured to measure the z-position of the point of incidence (108) of the pressurized laminar fluid jet (104) on the workpiece (101) by using an electromagnetic radiation or acoustic waves.

22. The apparatus (100) according to claim 4, wherein the measuring unit (107) is configured to measure the z-position of the point of incidence (108) of the pressurized laminar fluid jet (104) on the workpiece (101) by measuring a characteristic length of the pressurized laminar fluid jet (104).

23. The apparatus (100) according to claim 4, wherein the measuring unit (107) is configured to measure the z-position of the point of incidence (108) of the pressurized laminar fluid jet (104) on the workpiece (101) through the pressurized laminar fluid jet (104).

24. The apparatus (100) according to claim 4, wherein the measuring unit (107) is integrated into the machining unit (103).

* * * * *